United States Patent Office 2,770,353
Patented Nov. 13, 1956

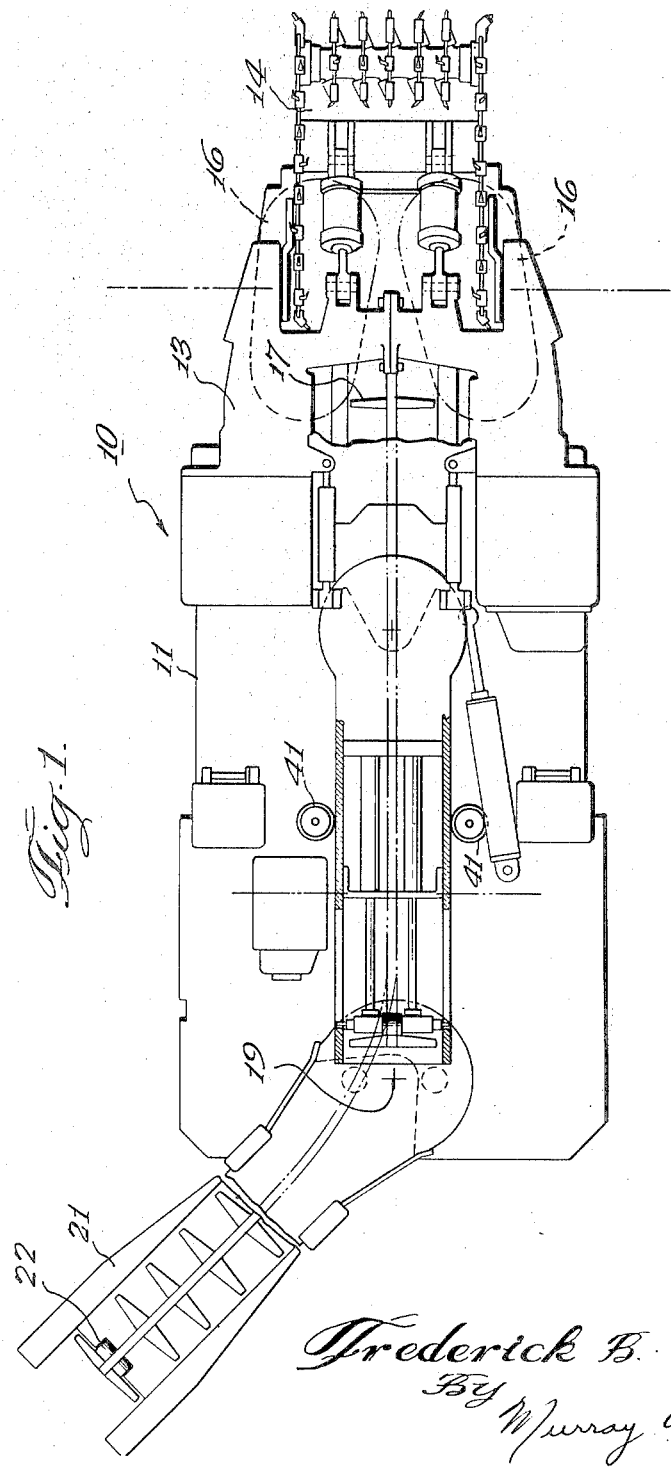

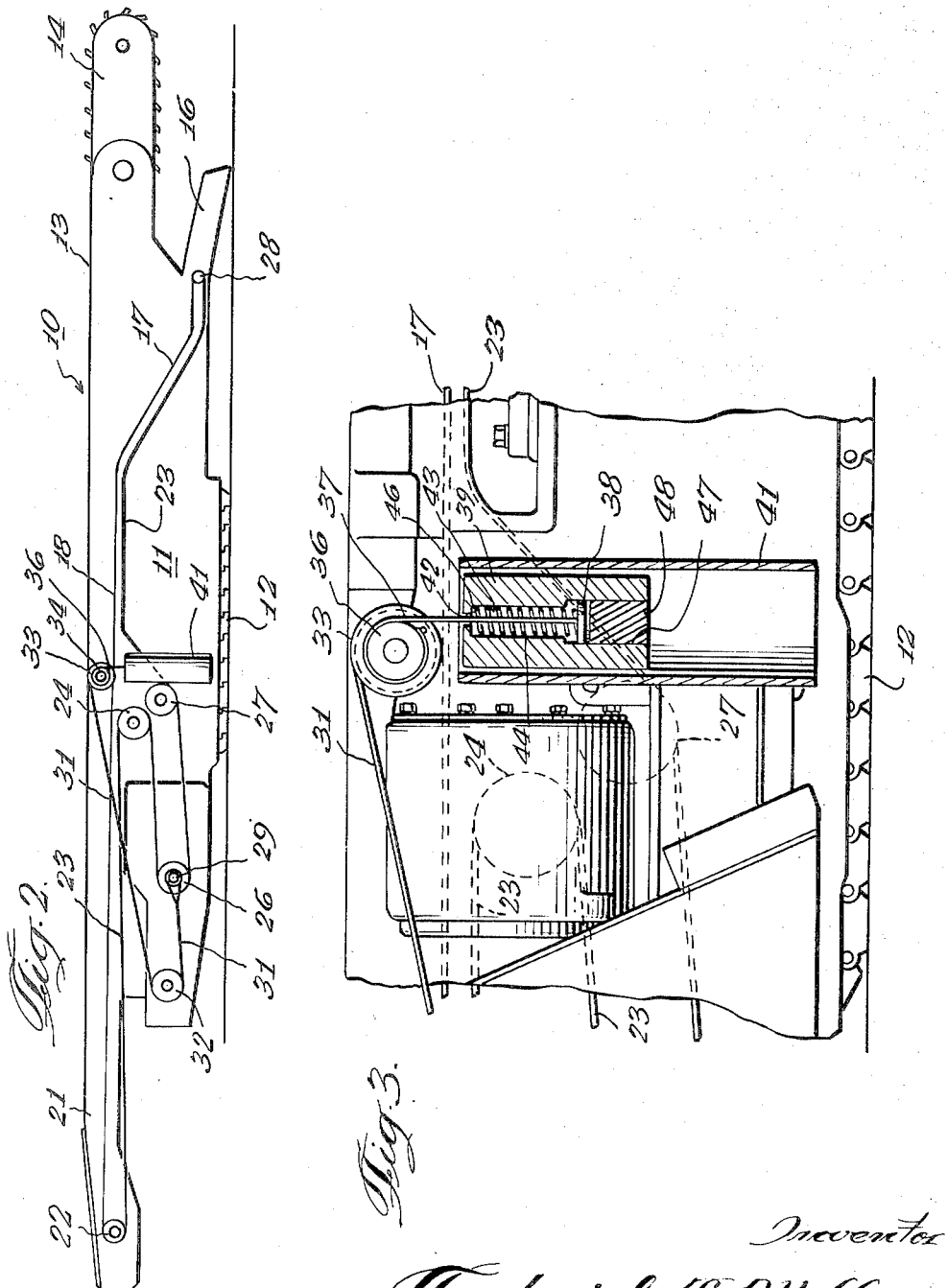

2,770,353

TAKEUP DEVICE FOR ARTICULATED CONVEYORS AND CUSHIONING MEANS THEREFOR

Frederick B. Miller, Chicago, Ill., assignor to Goodman Manufacturing Company, Chicago, Ill., a corporation of Illinois Application August 26, 1953, Serial No. 376,666

1 Claim. (Cl. 198—109)

This invention relates generally to improvements in articulated flight conveyors for a mining machine or the like, and more particularly to improvements in devices for taking up the slack in a chain flight conveyor occasioned by the articulation of various parts of such mining machine or the like.

In some types of mining machines, of which continuous miners are an example, fragmented material is transported by a chain flight conveyor which is required to change the effective of its conveying reach in accordance with the amount of articulation of the cutting head and the gathering head with respect to the main body of the machine, and also of the amount of articulation of the discharge boom. In some types of continuous miners the cutting head is arranged to move with the gathering mechanism in forward and reverse directions upon a pair of spaced rails. In order to accommodate the change in effective length of the conveying reach occasioned by such movement of the gathering head and the cutter head, the chain flight conveyor has been provided with hydraulically operated flight conveyor adjusting devices.

However, when the flights reverse their direction, a certain amount of impact takes place at the shoe or sheave where such reversal of direction of the conveyor takes place, and at points where the idler shoes are adjusted in apart dimension by means of hydraulic cylinders, such impact at the reversal point on such shoes has caused an inordinate amount of pressure to build up within such hydraulic takeup cylinders. In spite of the provision of suitable valve mechanisms for controlling the amount and pressure of fluid to said cylinders, the impact or shock by the flights at such reversing shoes has caused the pressure fluid in the cylinders to build up in excess of a desired amount.

According to the present invention provision is made in a machine of the types described whereby the change in working length of such a chain flight conveyor is readily accomplished, all without the necessity of costly hydraulic apparatus and controls therefor. In a preferred form of the invention the chain flight conveyor is reversed in direction around a single idler shoe or sheave which is connected by means of a flexible strand trained around a fixed sheave and wrapped around a further sheave arranged with a sheave of different diameter having a second strand wrapped thereon, which second strand is elastically connected to a counter-weight which adjusts the proper position of the first named idler sheave to maintain at all times a proper degree of tension upon the flight conveyor, and which will operate to take up any slack therein.

One of the principal objects of the invention is to provide a simple form of the slack takeup device for an articulated or extensible flight conveyor, which takeup device is characterized by complete absence of any hydraulically operated parts.

Other objects and important features of the invention will be apparent from a study of the following specification taken with the drawings which together show a preferred embodiment of the invention and what is now considered to be the best mode of practicing the principles thereof. Other embodiments of the invention may be suggested to those having the benefit of the teachings herein, and such other embodiments are intended to be reserved especially as they fall within the scope and purview of the appended claim.

In the drawings:

Fig. 1 is a plan view of a continuous miner having an articulated conveyor therein, said articulated conveyor having embodied therewith the improvements according to the present invention;

Fig. 2 is a schematic side view thereof; and

Fig. 3 is an enlarged side elevation view of a portion of the machine shown in Fig. 1, showing certain details of the takeup device according to the present invention.

Referring now particularly to Figs. 1 and 2 of the drawings, the improvements according to the present invention are embodied in a continuous miner indicated generally by the reference numeral 10, and comprising a main frame 11 mounted upon endless crawler threads 12. The main frame 11 has a horizontally movable extension frame 13 to which is pivoted for up and down vertical movement a cutting head 14. Material fragmented from a seam of coal or the like is gathered by a gathering mechanism 16 for transport of the fragmented material to a flight conveyor 17.

As seen in Fig. 2, the flight conveyor 17 has an upper reach 18 which moves the length of the main frame 11, the upper reach 18 moving past a point of articulation 19 of a discharge boom 21. The upper reach 18 reverses in its direction about an idler shoe 22 situated near the end of the discharge boom 21, and the lower reach 23 thereof is trained about an idler shoe or sheave 24 disposed below the upper reach 18. The lower reach 23 reversed in direction at the shoe 24, and further trained about a movable idler sheave or shoe 26 to reverse in direction once more to pass below and around a fixed idler sheave 27, the lower reach 23 being finally reversed in direction at the front end thereof about a forward shoe or sheave 28 adjacent the gathering mechanism 16.

As the discharge boom 21 articulates with respect to the main frame 11 of the machine, and as the extensible frame 13 moves upon its guides, not shown, with respect to the main frame 11, the flight conveyor 17 consisting of the upper reach 18 and the lower reach 23 must change its effective working length, and such change in effective length is made possible by adjusting the position of the idler shoe or roller 26. To this end the idler shoe or roller 26 is connected at each end thereof to a shaft 29. A flexible strand 31 is connected to the shaft 29, and is trained around a fixed idler sheave or shoe 32 adjacent the rear end of the main frame 11. The strand 31 is then wrapped about and fastened to a sheave 33, said sheave turning about a center indicated by the reference numeral 34. A smaller sheave 36 is arranged to turn with the sheave 33 about the same turning axis 34 and has wrapped therearound and fastened thereto a flexible strand 37 which is anchored at its lower end as seen in Fig. 3 to a disc 38.

Tension is applied to the strand 38 by means of a weight 39 which is guided on each side of the upper reach 18 of the flight conveyor 17 within a tubular guide 41. As seen in Fig. 3, the weight 39 is bored centrally thereof as at 42 to provide an opening for threading of the strand or cable 37. The weight 39 is also bored as at 43 to provide a recess for a spring 44 having its upper end bearing against a shoulder 46 formed at the juncture of the opening 42 and the bore 43, said spring 44 being bottomed at its lower end upon the movable disc 38. In order to supply additional weight, and for purpose of assembly of the structure accompanying the weight 39, the weight 39 may be counter-bored as at 47 and closed by a plug 48.

It will be seen from the description thus far that the idler sheave 29 will move under the tension of the strand 31 created by the weight 39. It will be obvious also that in order to provide a relatively large movement of the sheave 29 for a relatively small movement of the weight 39 the sheaves 33 and 36 are of respectively large and small diameters, which enables the weight 39 to be constructed as heavily as possible consistent with size limitations and yet have its movement relatively small as compared to the amount of movement of the strand 31.

As the flights of the conveyor 17 travel about the shoes 22, 24, 26, 27 and 28 a substantial amount of impact takes place, which is reflected into movement given to the movable sheave 26 and which results in a constant tugging action on the strand 31. Such tugging action upon the strand 31 will, of course, be transmitted by the different diametered sheaves 33 and 36, and by means of the spring 44 the weight 39 will have a certain amount of floating action with respect to the strand 37 thereby providing a cushioning effect not effecting the movement of the weight 39 during such small amounts of movement of the strand 31 under the conditions described.

It will be apparent also that the weight 39 is free to take a proper position in accordance with the amount of takeup at the idler shoe 32.

It will be apparent from the foregoing description that there has been provided a simple and novel arrangement for taking up the slack in an articulated flight conveyor, such slack being occasioned by the changes in effective length of the conveyor reach of such conveyor.

While the invention has been described in terms of a preferred embodiment thereof its scope is not intended to be limited by such described embodiment nor otherwise than by the terms of the claim here appended.

I claim as my invention:

In an articulated flight conveyor for a mining machine, said conveyor being characterized by idler members over which the conveyor is trained for reversal in direction thereof, means for taking up the slack occasioned by changes in effective length of a conveying reach of said conveyor during articulation thereof and for absorbing the shocks incident to reversal of direction of such conveyor over said idler members, said takeup means comprising a movable idler shoe over which said conveyor is reversed in direction, a flexible strand connected to said movable idler shoe, a fixed sheave around which said strand is wrapped and fastened, a second sheave of smaller diameter having a second flexible strand wrapped therearound and fastened thereto, and a weight connected to said second strand and having guide means therefor, resilient means disposed within said weight and having one end bottomed against said weight and its other end bottomed against means confining said resilient means and secured to said second strand for cushioning the tugging upon said strands occasioned by the shocks induced by passage of said flights around said idler members and said movable idler shoe.

References Cited in the file of this patent
UNITED STATES PATENTS

| | | |
|---|---|---|
| 1,883,007 | Sheel | Oct. 18, 1932 |
| 2,633,977 | McMillan | Apr. 7, 1953 |